(12) United States Patent
Kim

(10) Patent No.: US 12,582,922 B2
(45) Date of Patent: Mar. 24, 2026

(54) HYDROGEN SULFIDE ADSORPTION DISTILLER USING PURE COPPER

(71) Applicant: BREW & DISTILL SYSTEM LTD., Icheon-si (KR)

(72) Inventor: Ju-Su Kim, Icheon-si (KR)

(73) Assignee: BREW & DISTILL SYSTEM LTD., Icheon-si (KR)

( * ) Notice: Subject to any disclaimer, the term of this patent is extended or adjusted under 35 U.S.C. 154(b) by 466 days.

(21) Appl. No.: 18/017,379

(22) PCT Filed: Jul. 29, 2020

(86) PCT No.: PCT/KR2020/009986
§ 371 (c)(1),
(2) Date: Jan. 20, 2023

(87) PCT Pub. No.: WO2022/019365
PCT Pub. Date: Jan. 27, 2022

(65) Prior Publication Data
US 2023/0271104 A1 Aug. 31, 2023

(30) Foreign Application Priority Data
Jul. 21, 2020 (KR) ........................ 10-2020-0090259

(51) Int. Cl.
*B01D 5/00* (2006.01)
*B01D 3/00* (2006.01)
(Continued)

(52) U.S. Cl.
CPC .............. B01D 5/006 (2013.01); B01D 3/00 (2013.01); B01D 53/02 (2013.01); C12H 1/18 (2013.01);
(Continued)

(58) Field of Classification Search
CPC .......... B01D 5/006; B01D 3/00; B01D 53/02; B01D 2253/1122; B01D 2257/304;
(Continued)

(56) References Cited

FOREIGN PATENT DOCUMENTS

| | | |
|---|---|---|
| GB | 2590218 A | 6/2021 |
| JP | 2012-016321 A | 1/2012 |

(Continued)

OTHER PUBLICATIONS

Cho et al., "Quality Characteristics of Fruit Spirits from a Copper Distillation Apparatus" J Korean Soc Food Sci Nutr 42, May 2013, 743-752 (Year: 2013).*

(Continued)

*Primary Examiner* — Anthony J Zimmer
*Assistant Examiner* — Abdul-Rahman Yusuf Waleed Smari
(74) *Attorney, Agent, or Firm* — Maschoff Brennan

(57) ABSTRACT

A hydrogen sulfide adsorption distiller using pure copper of the present invention has advantages in that, while alcohol vaporized in a heating vessel 100 sequentially passes through a retention tube 120, which is formed of pure copper having a catalytic reaction, a vertical tube 130, a spiral coil 132, a cooling vessel 140, and a liquid collecting tray 150 until distilled liquor C of condensed liquefied alcohol is completed, vaporization process is facilitated, and at the same time, hydrogen sulfide of the vaporized alcohol and the condensed liquefied alcohol is adsorbed, and thus, hydrogen sulfide, which (adversely) affects the organoleptic flavour properties of distilled liquor C, is removed as much as possible, thus improving liquor quality.

7 Claims, 2 Drawing Sheets

(51) Int. Cl.
  *B01D 53/02* (2006.01)
  *C12H 1/18* (2006.01)
(52) U.S. Cl.
  CPC   *B01D 2253/1122* (2013.01); *B01D 2257/304*
  (2013.01)
(58) Field of Classification Search
  CPC ............ B01D 3/005; B01D 2258/0275; B01D
  5/0063; B01D 53/0446; C12H 1/18;
  C12H 6/02; C12C 13/08; C12C 2200/00;
  C12G 3/02; C12G 2200/00; C12G 3/12
  See application file for complete search history.

(56) References Cited

FOREIGN PATENT DOCUMENTS

| | | | | |
|---|---|---|---|---|
| KR | 2003-0059541 | A | 7/2003 | |
| KR | 10-2011-0087883 | A | 8/2011 | |
| KR | 20110087883 | A * | 8/2011 | ............... C12G 3/12 |
| KR | 10-1871320 | B1 | 6/2018 | |
| WO | 2020/004616 | A1 | 1/2020 | |

OTHER PUBLICATIONS

Lee et al., "Quality characteristics of distilled alcohols prepared with different fermenting agents" J Korean Soc Appl Biol Chem 58, Feb. 2015, 275-283 (Year: 2015).*

* cited by examiner

[FIG. 1]
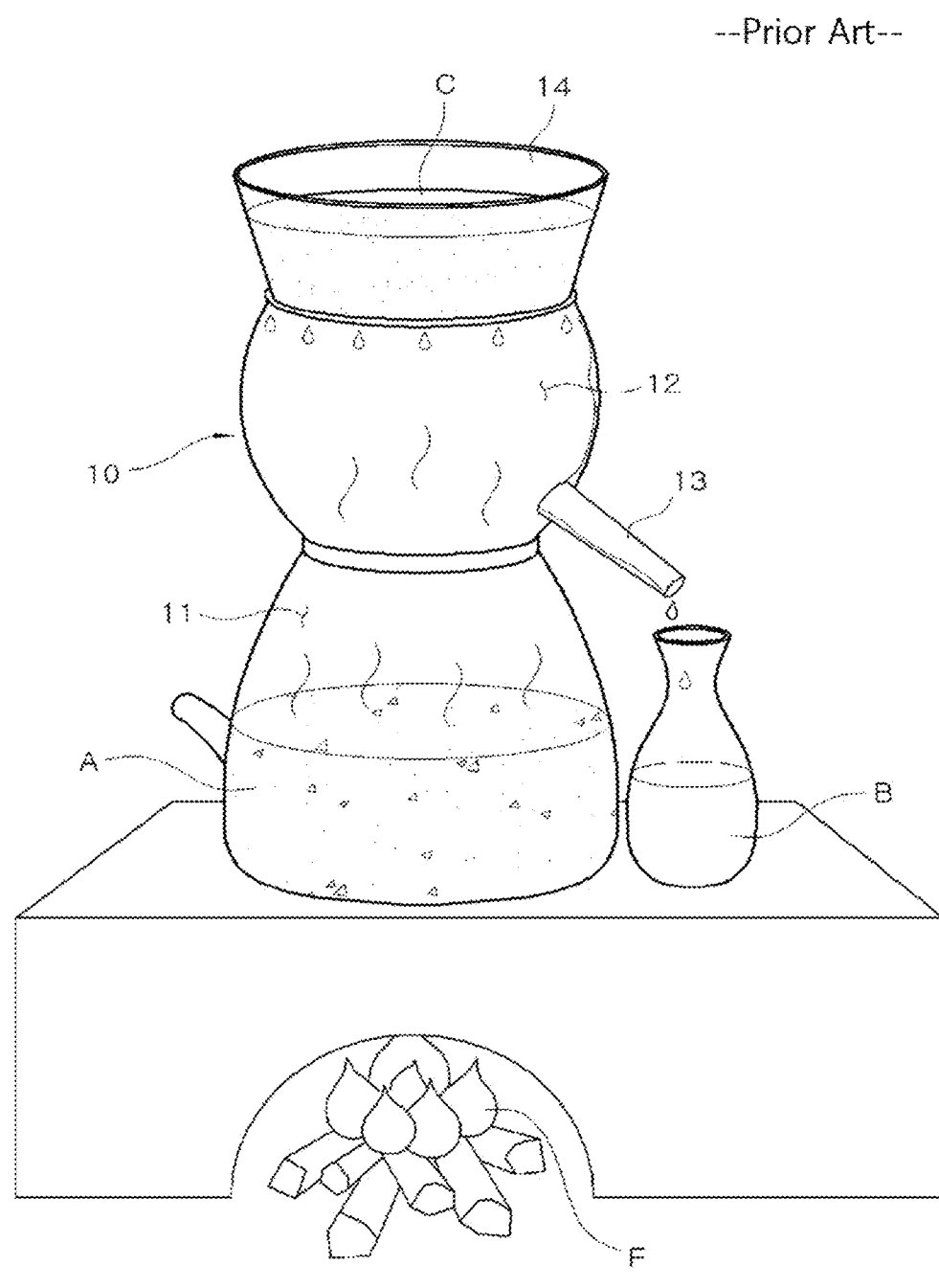
--Prior Art--

[FIG. 2]
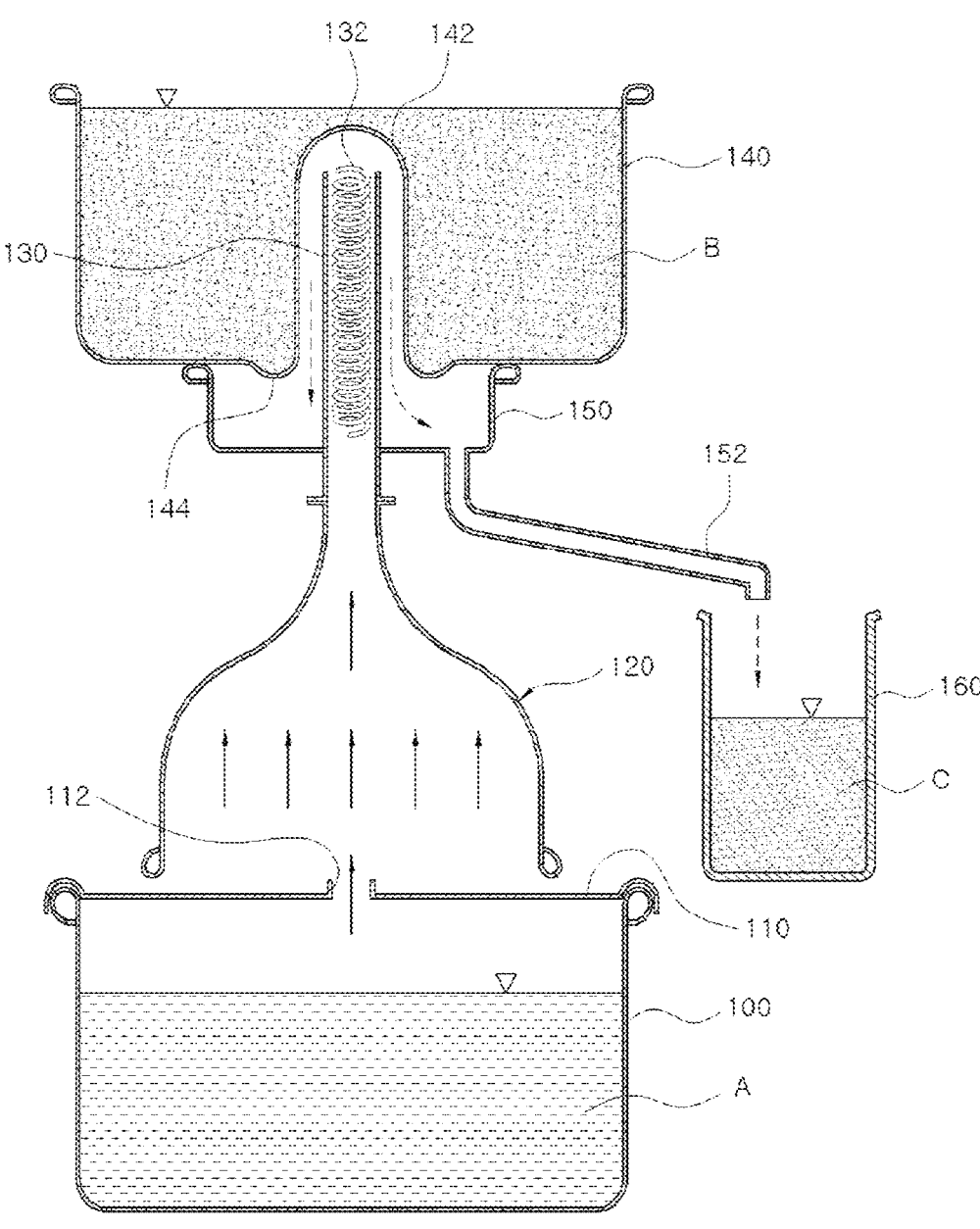

HYDROGEN SULFIDE ADSORPTION DISTILLER USING PURE COPPER

A copper condensing unit for distilling machine

TECHNICAL FIELD

The present invention relates to a copper condensing unit for a distilling machine, more particularly, to a hydrogen sulfide adsorption distiller using copper that can easily adsorb and remove hydrogen sulfide ($H_2S$) from fermented liquor by a copper condensing unit for distilling machine.

BACKGROUND ART

Generally, an alcoholic drink is a beverage containing alcohol, and generally refers to a beverage containing 1% or more of alcohol.

Alcohol is broadly divided into fermented wine, distilled liquor, and compounded liquor, depending on the production method or the alcohol content.

The fermented liquid is an alcoholic drink in which diastase, which is a starch saccharifying enzyme, and yeast, which is a fermenting agent, are acted on sugar contained in fruits, that is, starch-contained grains converted to sugars, and fermented. The fermented liquid contains a lower alcoholic content of about 8 to 14 degrees depending on the sugar content of the raw material or the type of fermenting yeast, and beer and wine belong to this category.

Distilled liquor is made by distilling a fermented wine to obtain a higher percentage of alcohol from fermented wine, whiskey, brandy, rum, gin, vodka, tequila, and soju belong to this category. It usually contains alcohol of 40 percent or more.

Distilled soju, which is a type of distilled liquor, is obtained by mixing starch-containing raw materials with ipguk and water, then, fermenting, and distilling. As a raw material for distilled soju, starch-rich grains such as rice, barley and corn, and root and tuber crops such as potatoes and sweet potatoes are used. Among them, sweet potatoes contain beta-carotene, which is a precursor of vitamin A, and thus exhibit anti-cancer properties, and also contain high-quality dietary fibre and Alaafin, and thus exhibit constipation-relieving action. Further, it contains a large number of other minerals such as potassium and calcium and various vitamins and thus is mainly used as a raw material for distilled soju.

During the production of distilled spirits, the distilled liquor is obtained from vaporizing the fermented alcohol by heating and condensing the vaporized alcohol through cooling in a reverse way. As described above, fermented wine is made by fermenting fruits or grains. Solid components of fruits and grains other than alcohol still remain in the fermented wine, If the fermented wine is heated directly, the solid component could be burned and adhered to the heating surface, and then, the burnt smell comes out from the distilled spirit.

In addition, if harmful gases contained in the fermented liquid are removed from the liquid effectively, mellow and better-quality distilled spirits can be produced. A typical harmful gas is hydrogen sulfide.

FIG. 1 is a diagram showing a general type of distiller.

As shown in FIG. 1, a general type of distiller includes a distillation vessel 10 that consists of the first chamber 11 and the second chamber 12 located above the first chamber 11.

The fermented wine A is filled up in chamber 11 and heated, and then, alcohol vaporized by a heat source F can flow to the second chamber 12.

A cooling vessel 14 containing cooling water C is located on the upper part of the second chamber 12, wherein the vaporized alcohol is reached in the second chamber 12 would be cooled by cooling water C and condensed in the lower part of the cooling vessel 14 to be liquefied.

At this same time, the liquefied alcohol is the distilled liquor B and drained outside through a drain tube 13 along the wall surface of the distillation vessel 10.

However, such a conventional distiller heats the wine (A) through a heat source F directly, which is hard to control the distilling temperature of the wine, and the material of the vessel is not copper. Therefore, some of the solid particles are burned and adsorbed on the inner surface of the first chamber inside 11, burnt flavour could be coming out from the distilled liquor B. In addition, it has the disadvantage of not being able to get rid of hydrogen sulfide and is of lower quality, it has a disadvantage in that liquid quality has deteriorated.

DETAILED DESCRIPTION OF THE INVENTION

Technical Problem

The present invention has been proposed to solve the problems in consideration of the various problems of the prior art. The object of the present invention is to provide the copper condensing unit for the distilling machine in which vaporization is facilitated more. At the same time, hydrogen sulfide of the vaporized alcohol and the condensed liquefied alcohol is adsorbed with copper by catalytic reaction. Thus, hydrogen sulfide, which affects the organoleptic flavour properties of the distilled liquor C in a negative way, should be removed as much as possible, then, the quality of the liquor is improved.

Technical Solution

In order to achieve the above object, according to one embodiment of the present invention, there is provided a copper condensing unit for a distilling machine comprising: a heating vessel that heats a stored fermented liquid A by a heat source; a retention tube which is installed in the upper part of the heating vessel, formed of copper so as to adsorb hydrogen sulfide from the vaporized alcohol; a vertical tube which is formed of copper and coupled to the upper part of the retention tube, which adsorbs hydrogen sulfide contained in the vaporized alcohol rising through the retention tube; a cooling vessel which is formed of copper so as to adsorb hydrogen sulfide of condensed liquefied alcohol while condensing the vaporized alcohol by the cooling temperature of the stored cooling water, wherein the vaporized alcohol passing through the vertical tube is turned downward toward the lower part while flowing around the outside of the vertical tube with a certain gap; and a liquid collecting tray which is installed below the lower part of the cooling vessel and adsorbs hydrogen sulfide from the condensed liquefied alcohol while receiving the condensed liquefied alcohol flowing down, and drains it to the receiver vessel.

In another embodiment of the present invention, the upper opening of the heating vessel includes a vessel lid having a vent hole formed in the center.

In another embodiment of the present invention, the retention tube is in the form of a cone whose passage gradually decreases from the lower part to the upper part.

In another embodiment of the present invention, a spiral coil is installed inside the vertical tube.

In another embodiment of the present invention, the center of the bottom of the cooling vessel is formed with a vertically submerged part which is opened downward on the outside of the bottom, protrudes vertically to a certain height inside the bottom, and is submerged in the cooling water stored in the cooling vessel.

In another embodiment of the present invention, the submerged part has a hemispherical shape which is convexly formed upward from the upper end, and a dripping part protruding downward from the bottom height of the cooling vessel is formed at the edge of the lower end.

In another embodiment of the present invention, a drain tube is installed at the side of the liquid collecting tray.

Advantageous Effects

A copper condensing unit for the distilling machine of the present invention has effects in that, while alcohol vaporized in the heating vessel sequentially passes through a retention tube, which is formed of pure copper having a catalytic reaction, a vertical tube, a spiral coil, a cooling vessel, and until distilled liquor of condensed liquefied alcohol is completed. In this process the vaporization reaction process is further facilitated. At the same time, hydrogen sulfide of the vaporized alcohol and the condensed liquefied alcohol should be adsorbed. Thus, hydrogen sulfide, which affects the organoleptic flavour properties of distilled liquor negative way, is removed as much as possible, thereby improving liquor quality.

BRIEF DESCRIPTION OF THE DRAWINGS

FIG. 1 is a configuration diagram showing a conventional distiller; and

FIG. 2 is a configuration diagram showing a copper condensing unit for the distilling machine according to the present invention.

| *Description of Reference Numerals* | |
| --- | --- |
| 100: Heating vessel | 110: Vessel lid |
| 112: Vent hole | 120: Retention tube |
| 130: Vertical tube | 132: Spiral coil |
| 140: Cooling vessel | 142: Submerged part |
| 144: Dripping part | 150: Liquid collecting tray |
| 152: Drain tube | 160: Receiver vessel |
| A: Fermented wine | B: Cooling water |
| C: Distilled liquor | |

DETAILED DESCRIPTION OF THE EMBODIMENTS

In order to fully understand the present invention, preferred embodiments of the present invention will be described in detail with reference to the accompanying drawings. However, the present invention can be modified in various ways and is not limited to the embodiments set forth herein. Therefore, the shape of elements in the drawings may be exaggerated to emphasize clearer description. It should be noted that the same configuration in each drawing is sometimes illustrated with the same reference numerals. Detailed descriptions of well-known functions and configurations which are determined to obscure the subject matter of the present invention will be omitted.

FIG. 2 is a configuration diagram showing a copper condensing unit for the distilling machine according to the present invention.

Distilled liquor is an alcoholic beverage made by distilling the primary fermented wine to obtain a higher alcohol percentage than a fermented wine. Distillation is the process of obtaining high-concentration alcohol by using the difference in the boiling points between alcohol and water. When the fermented wine is heated slowly, the alcohol with a lower boiling point evaporates earlier than water. By collecting and cooling the evaporating vapours or gases such as steam, a high-concentration alcoholic liquid can be obtained in the end.

Referring to FIG. 2, a copper condensing unit for the distilling machine according to embodiments of the present invention comprises: a heating vessel 100 that directly or indirectly heats a stored fermented wine by a heat source to form vaporized alcohol; a vessel lid 110, having a vent hole 112 positioned in the center to increase the pressure for pushing out the vaporized alcohol from the heating vessel 100 while covering the upper opening of the heating vessel 100, a retention tube 120, which is installed at the upper part of the heating vessel 100 and primarily adsorbs hydrogen sulfide from the vaporized alcohol while temporarily retaining the vaporized alcohol escaping through the vent hole 112; a vertical tube 130, in which a spiral coil 132 is fitted so as to secondarily adsorb hydrogen sulfide from the vaporized alcohol; a cooling vessel 140, having a vertical submerged part 142, which thirdly adsorbs hydrogen sulfide from the condensed liquefied alcohol while condensing it using the cooling temperature of the stored cooling water B, when the vaporized alcohol passing through the vertical tube 130 turns downward toward the lower part while flowing around the outside of the vertical tube with a certain gap; and a liquid collecting tray 150, installed below the cooling vessel 140, which fourthly adsorbs hydrogen sulfide from the condensed liquefied alcohol while receiving the condensed liquefied alcohol flowing down through the gap between the vertical tube 130 and the submerged part 142, and drains it to the receiver vessel 160.

That is, the heating vessel 100 and the storage vessel 160 are preferably formed of stainless steel or steel.

The retention tube 120, the vertical tube 130, the spiral coil 132, the cooling vessel 140 and a liquid collecting tray 150 are preferably formed of pure copper, which is easily catalyzed so as to facilitate adsorption and removal of hydrogen sulfide of vaporized alcohol and condensed liquefied alcohol.

At this time, the retention tube 120 has a conical shape with a passage that becomes narrower from the lower part to the upper part, when the vaporized alcohol in the heating vessel 100 escapes through the vent hole 112 of the vessel lid 110, it cannot be quickly discharged through the narrower upper opening of the retention tube 120, compared to the wider lower inlet. While temporarily retained in the retention tube 120, hydrogen sulfide contained in the vaporized alcohol is primarily adsorbed and removed on the inside surface of the wall of retention tube 120, which is formed of pure copper having a catalytic reaction.

The vertical tube 130 and the spiral coil 132 fitted and fixed to the internal hole of the vertical tube 130 form a spiral passage to minimize interference with the upward flow of the vaporized alcohol while increasing the contact area of copper with the vaporized alcohol passing through from the retention tube 120.

As the vaporized alcohol passes upward through the spiral passage, hydrogen sulfide of the vaporized alcohol is secondarily adsorbed and removed on the inner surface of the vertical tube 130 and the surface of the spiral coil 132, formed of pure copper, has a catalytic reaction as well.

The cooling vessel 140 has an open upper part to store the cooling water B and can close the opening with a vessel lid to enhance the cooling effect, if necessary.

The submerged part 142 for protruding from the center bottom of the cooling vessel 140 is preferably opened to the outside downward with respect to the center of the bottom of the cooling vessel 140, and protrudes vertically up to a certain height inside the bottom, so as to be submerged in the cooling water B, and free space is preferably formed through the submerged part 142 so that the outer peripheral surface and the upper end of the vertical tube 130 do not come into contact with each other. At this time, the upper end of the submerged part 142 is guided by the upper end of the submerged part 142, so that the vaporized alcohol discharged through the upper end of the vertical tube 130 is turned downward while being dispersed in all directions. At the same time, the upper end of the submerged part 142 is preferably formed in a hemispherical shape protruding upward, so as to come into contact with its inner surface and facilitate heat exchange.

The edge of the lower end of the submerged part 142 preferably forms dripping part 144 that protrudes downward lower than the bottom height of the cooling vessel 140, for the condensed liquefied alcohol dripping along the inside of the submerged part 142 to ensure that it flows down into the liquid collecting tray 150.

The liquid collecting tray 150 is coupled around the lower outer peripheral surface of the vertical tube 130 so as to surround the lower opening edge of the submerged part 142, and the drain (discharge) tube 152 is preferably installed at the side of the bottom of the liquid collecting tray 150 to drain the condensed liquefied alcohol to the receiver vessel 160 for storing the distilled liquor C.

In this manner, a hydrogen sulfide adsorption distiller using pure copper of the present invention has advantages in that, while alcohol vaporized in a heating vessel 100 sequentially passes through a retention tube 120, which is formed of pure copper having a catalytic reaction, a vertical tube 130, a spiral coil 132, a cooling vessel 140, and a liquid collecting tray 150 until distilled liquor C of condensed liquefied alcohol is completed, vaporization process is facilitated, and at the same time, hydrogen sulfide of the vaporized alcohol and the condensed liquefied alcohol is adsorbed, and thus, hydrogen sulfide, which affects the organoleptic flavour properties of distilled liquor C negatively, is removed as much as possible, thus improving liquor quality.

On the other hand, it will be understood that the present invention is not limited to the above-mentioned embodiments, but modifications and variations can be made without departing from the spirit and scope of the present invention, and the technical ideas to which such modifications and variations are applied also fall within the scope of the following claims.

The invention claimed is:

1. A copper condensing unit for a distilling machine comprising:

a vertical tube (130) which is formed of copper so as to adsorb hydrogen sulfide contained in vaporized alcohol by heating fermented liquid (A) by a heat source;

a cooling vessel (140) which is formed of copper and spaced apart from an outside of the vertical tube (130) so as to adsorb hydrogen sulfide contained in a condensed liquefied alcohol while condensing the vaporized alcohol that turns downward after passing through the vertical tube (130) by a cooling temperature of stored cooling water (B); and a liquid collecting tray (150) which is placed under the cooling vessel (140), adsorbs hydrogen sulfide contained in the condensed liquefied alcohol while receiving and draining the condensed liquefied alcohol to a storage vessel (160).

2. A copper condensing unit for the distilling machine according to claim 1, wherein a retention tube (120) formed of copper is coupled to a lower part of the vertical tube (130), and is configured to adsorb hydrogen sulfide contained in the vaporized alcohol while retaining the vaporized alcohol generated by heating fermented liquid A by a heat source.

3. A copper condensing unit for the distilling machine according to claim 2, wherein the retention tube (120) has a conical shape decreasing in diameter from a lower part to an upper part of the retention tube (120).

4. A copper condensing unit for the distilling machine according to claim 1, wherein a spiral coil (132) is installed inside the vertical tube (130).

5. A copper condensing unit for the distilling machine according to claim 1, wherein a submerged part (142) provided at a center of the cooling vessel (140), is hollowed downward to be opened toward an outside of the bottom portion of the cooling vessel (140) and protrudes upward to a predetermined height vertically while being submerged in the stored cooling water (B) of the cooling vessel (140).

6. A copper condensing unit for the distilling machine according to claim 5, wherein an upper part of the submerged part (142) is formed in a hemispherical shape, and a bottom part of a dripping part (144) protrudes downward beyond a bottom edge of the cooling vessel (140).

7. A copper condensing unit for the distilling machine according to claim 1, wherein a drain tube (152) is installed on a side of the liquid collecting tray (150).

* * * * *